(12) United States Patent
Van Deurzen

(10) Patent No.: US 12,294,277 B2
(45) Date of Patent: May 6, 2025

(54) DRIVE UNIT FOR A VEHICLE

(71) Applicant: Punch Powertrain PSA e-transmissions NV, Sint-Truiden (BE)

(72) Inventor: Antonius Arnoldus Maria Van Deurzen, Sint-Truiden (BE)

(73) Assignee: PUNCH POWERTRAIN PSA E-TRANSMISSIONS NV, Sint-Truiden (BE)

( * ) Notice: Subject to any disclaimer, the term of this patent is extended or adjusted under 35 U.S.C. 154(b) by 359 days.

(21) Appl. No.: 17/785,195

(22) PCT Filed: Dec. 18, 2020

(86) PCT No.: PCT/EP2020/087037
§ 371 (c)(1),
(2) Date: Jun. 14, 2022

(87) PCT Pub. No.: WO2021/123179
PCT Pub. Date: Jun. 24, 2021

(65) Prior Publication Data
US 2023/0006504 A1      Jan. 5, 2023

(30) Foreign Application Priority Data

Dec. 20, 2019   (BE) .................................. 2019/5957

(51) Int. Cl.
*H02K 5/22*  (2006.01)
*B60L 53/22* (2019.01)
(Continued)

(52) U.S. Cl.
CPC .............. *H02K 5/225* (2013.01); *B60L 53/22* (2019.02); *H02K 3/04* (2013.01); *H02K 5/10* (2013.01); *H02K 11/33* (2016.01)

(58) Field of Classification Search
CPC .......... B60L 53/22; H02K 11/33; H02K 3/04; H02K 5/10; H02K 5/225; Y02T 10/64
See application file for complete search history.

(56) References Cited

U.S. PATENT DOCUMENTS 6,456,470 B1 *  9/2002  Cecconi ................. H02K 17/30
                                                  361/22
2009/0311899 A1 * 12/2009 Takehara ........... H01R 13/5213
                                                  439/292

(Continued)

FOREIGN PATENT DOCUMENTS

| JP | 2005304283 A | * | 10/2005 | ............ B60L 11/007 |
| JP | 2011-009092 A |  | 1/2011 | |
| KR | 20200142292 A | * | 12/2020 | |

OTHER PUBLICATIONS

KR-20200142292-A, Hyun, all pages (Year: 2020).*

(Continued)

*Primary Examiner* — Naishadh N Desai
(74) *Attorney, Agent, or Firm* — Pillsbury Winthrop Shaw Pittman, LLP

(57) ABSTRACT

Drive unit for an electrical vehicle, which drive unit comprises an electric motor including a winding, comprising a winding terminal. The drive unit further comprises an inverter having an inverter housing, and an inverter circuit provided within the inverter housing. The inverter circuit comprising an inverter terminal, wherein the winding terminal and the inverter terminal are directly connected to each other.

9 Claims, 1 Drawing Sheet

(51) Int. Cl.
*H02K 3/04* (2006.01)
*H02K 5/10* (2006.01)
*H02K 11/33* (2016.01)

(56) References Cited

U.S. PATENT DOCUMENTS

| | | | |
|---|---|---|---|
| 2012/0003856 A1* | 1/2012 | Yamaguchi | H01R 13/5202 439/271 |
| 2017/0093094 A1* | 3/2017 | Mukuno | H01R 13/6584 |
| 2019/0238032 A1* | 8/2019 | Miyoshi | H02K 5/225 |

OTHER PUBLICATIONS

JP-2005304283-A, Fujii et al. all pages (Year: 2005).*
International Search Report dated Jan. 20, 2021, issued in corresponding International Patent Application No. PCT/EP2020/087037 (2 pgs.).
Written Opinion of the International Searching Authority dated Jan. 20, 2021, issued in corresponding International Patent Application No. PCT/EP2020/087037 (7 pgs.).

* cited by examiner

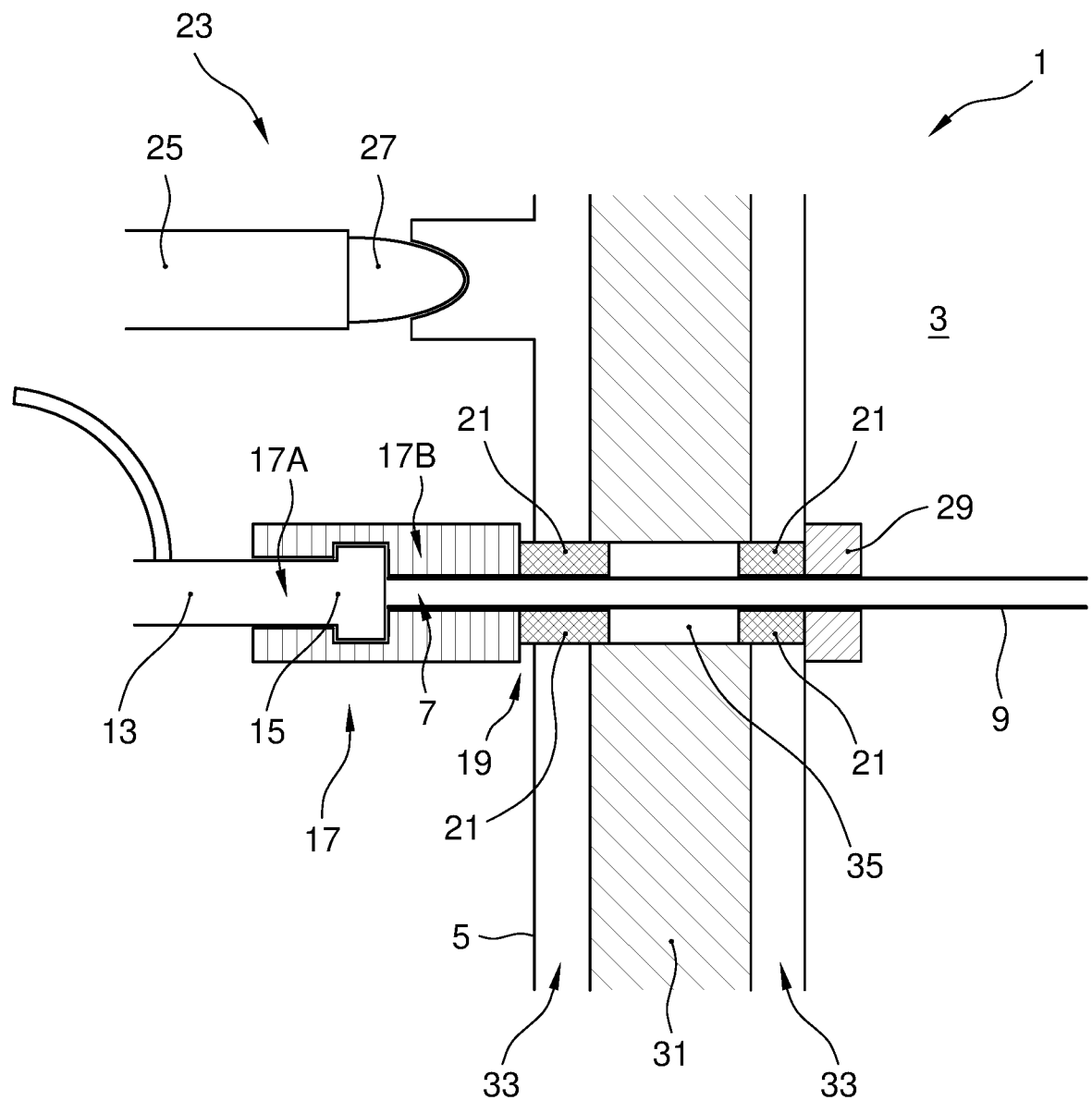

DRIVE UNIT FOR A VEHICLE

CROSS-REFERENCE TO RELATED APPLICATIONS

This application is the U.S. National Stage of PCT/EP2020/087037, filed Dec. 18, 2020, which claims priority to Belgium Patent Application No. BE2019/5957, filed Dec. 20, 2019, the contents of each of which are incorporated herein by reference in their entireties.

The invention relates to a drive unit, inverter, and a connector for an electrical vehicle.

BACKGROUND

In a drive unit of an electric vehicle, an inverter converts a direct current electric power of a battery into an alternating current electric power and supplies this alternating-current electric power to an electric motor in the vehicle. The alternating current electric power is typically supplied to the windings in a stator of the electric motor. The stator winding terminates in a winding bus terminal for connection to a terminal of the inverter. As most state of the art electric motors for electric vehicles comprise water or oil cooling systems to dissipate heat from the stator windings, a dedicated separation device is required between the stator windings and the inverter to prevent the oil of the cooling system to contaminate the inverter and the contacts of the connection between the winding bus terminal and the inverter terminal. The winding bus terminal and the inverter terminal are indirectly connected to each other via the separation device. Electrical terminals of the separation device are typically bolted the inverter terminals to obtain a secure and durable connection, while the separation device ensures that the connection is not contaminated with oil from the cooling system.

The separation device, however, takes up precious space of a drive unit of an electric vehicle, and adds to the overall assembly time and costs of the drive unit.

SUMMARY

It is an object of the invention to overcome or at least ameliorate some of the disadvantages of the known drive units of electric vehicles. In particular, it is an object to reduce assembly time and overall cost of a drive unit of an electric vehicle.

According to an aspect is provided a drive unit for an electrical vehicle, which drive unit comprises an electric motor including a winding, wherein one end of the winding comprises a winding bus terminal. The drive unit further comprises an inverter having an inverter housing, and an inverter circuit provided within the inverter housing. The inverter circuit comprising an inverter terminal. The inverter terminal can extend outwardly of the inverter housing. The winding bus terminal and the inverter terminal are directly connected to each other. In other words, there is no intermediate connection element involved in the connection between the inverter terminal and the winding bus terminal.

Optionally, the drive unit comprises a connector having a first connector member associated with the winding bus terminal and a second connector member associated with the inverter terminal.

The connector can be a snap-fit connector. This provides a simple connection between the terminals of the inverter and the electric motor, which takes little time to install. The first and second connector members may comprise, e.g. be, a male and female connector member respectively. For example, the connector may be push-pull type connector.

Optionally, at least one of the first and second connector members is arranged to elastically deform upon mating. Thus the elastic deformation provides a mating force. Said mating force can help ensure that electrical contact is maintained during operation of the electrical vehicle.

Optionally, the connector has a male and female connector member. The winding bus terminal is associated with a first one of the male and female connector member and the inverter terminal is associated with a second one of the male and female connector member. The male connector member and the female connector member are arranged to mate. In a connected state in which the male and female connector members mate, the winding bus terminal and the inverter terminal are electrically connected such as to establish an electrical connection between the winding of the electric motor and the inverter circuit.

Optionally, the inverter terminal is associated with the female connector member.

Optionally, the winding bus terminal is associated with the male connector member.

Optionally, the connector comprises locking means arranged for locking, in the connected state, the male and female connector members to each other. This ensures that the connector remains fixed in the connected state to sustain the electrical connection between the terminals of the inverter circuit and the electromotor, during driving of the electric vehicle.

Optionally, the male connector member comprises a hooking structure arranged for cooperation with a hooking structure of the female connector member.

Optionally, the connector comprises sealing means arranged for sealing the connector in the connected state from an environment of the connector. This isolates the connection from fluids, e.g. cooling liquids such as oil, of the electric motor.

Optionally, the inverter terminal is sealingly mounted to the inverter housing. This prevents fluids, e.g. cooling liquids such as oil, of the electric motor, from entering the inverter housing.

Optionally, the drive unit comprises sealing means arranged for providing a fluid sealing between a housing of the electric motor and the inverter housing. This prevents fluids, e.g. cooling liquids such as oil, of the electric motor from leaking out of the interior of the housing of the electric motor. Similarly, the sealing means prevent contaminants from the environment the drive unit from entering an interior of the drive unit, particularly an interior of the electric motor.

Optionally, the inverter circuit comprises a plurality of inverter terminals, such as six inverter terminals. Each inverter terminal is for example associated with a respective phase of a multi-phase, such as a six-phase, electric power circuit.

Optionally, the electric motor comprises a plurality of bus terminals, such as six bus terminals, each arranged for connection with an associated inverter terminal.

According to an aspect is provided an inverter for an electrical vehicle. The inverter comprises an inverter housing including an inverter housing wall, and an invertor circuit provided within the inverter housing. The inverter circuit comprises at least one inverter terminal for connection to an electric motor of the electric vehicle. The at least one inverter terminal includes a connector member for a direct connection to a connector member of the electric motor.

Optionally, the connector member is a male or female connector member.

Optionally, the inverter terminal extends outwardly of the inverter housing.

Optionally, the inverter terminal is provided externally from the inverter housing, wherein the inverter circuit comprises an inverter bus extending between the inverter terminal externally of the inverter housing and a remainder of the inverter circuit internally of the inverter housing through an opening of the inverter housing wall.

Optionally, a seal, such as a gland seal, is provided, which seal is arranged for providing a fluid seal between the inverter terminal and the inverter housing wall. Optionally the seal is arranged for providing a fluid seal between the inverter bus and the inverter housing wall.

Optionally, the inverter comprises sealing means arranged for providing a fluid seal between the inverter housing and a housing of the electric motor.

Optionally the inverter comprises a cooling body, which cooling body is provided within the inverter housing adjacent the inverter housing wall, the inverter terminal or inverter bus being provided through a hole in the cooling body.

According to an aspect is provided a connector for electrically connecting an inverter circuit of an electric vehicle and a winding of an electric motor of the electric vehicle. The connector comprises a male connector member and a female connector member. A first one of the male and female connector members is associated with a bus terminal of the winding and a second one of the male and female connector member is associated with a bus terminal of the inverter circuit. In a connected state of the connector, the male and female connector members mate to establish an electrical connection bus terminal of the winding and the bus terminal of the inverter circuit.

According to an aspect is provided an electric vehicle, such as an electric car, provided with a drive unit, inverter or connector, according to an aspect as described herein.

It will be appreciated that any one or more of the above aspects, features and options can be combined. It will be appreciated that any one of the options described in view of one of the aspects can be applied equally to any of the other aspects. It will also be clear that all aspects, features and options described in view of the drive unit apply equally to the inverter, connector and vehicle, and vice versa.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 1 shows a schematic representation of a drive unit for a vehicle.

DETAILED DESCRIPTION OF THE DRAWINGS

FIG. 1 shows a schematic representation of a drive unit 1. The drive unit comprises an inverter 3 having an inverter housing 5. The inverter 3 comprises an inverter circuit (not shown) having at least one inverter terminal 7. The inverter is arranged to convert a direct current electric power of a battery (not shown) into an alternating current electric power and supply, at least a part of, this alternating current electric power via the inverter terminal 7 to an electric motor of the vehicle. In this example, the inverter terminal 7 is electrically connected to the inverter circuit via a inverter bus 9. It is also possible that the inverter terminal 7 is directly coupled to the inverter circuit. The inverter generally comprises a plurality of inverter terminals corresponding to a plurality of windings of the electric motor. The inverter 3 may for example comprise three inverter terminals. Each terminal, for example, corresponds to a phase of a three-phase electric power circuit of the inverter. Alternatively, the inverter 3 may for example comprise six inverter terminals. Each terminal, for example, corresponds to a phase of a six-phase electric power circuit of the inverter.

The drive unit 1 further comprises the electric motor of the vehicle. The electric motor has at least one winding 11, for example a stator winding. The winding 11 is electrically connected, e.g. at an end of the winding, to a winding bus terminal 15 for connection to the inverter terminal 7.

A connector 17 is provided for connecting the winding bus terminal 15 to the inverter terminal 7. Here, the connector 7 is a snap-fit connector having a male connector member 17A and a female connector member 17B. the male and female connector members 17A, 17B are arranged to mate such as to establish an engagement of the winding bus terminal 15 and the inverter terminal 7. FIG. 1 shows the connector 17 in a connected state in which the male and female connector members 17A, 17B mate. In the connected state, the winding bus terminal 15 and the inverter terminal make contact with each other to electrically connect the inverter circuit with the winding 11. Here, in the mating position the male connector member 17A elastically deforms the female connector member 17B. Thus the female connector member 17B will continuously apply a force onto the male connector member 17A. Hence, a good and lasting electrical connection is provided.

In FIG. 1, the female connector member 17B is associated with the inverter terminal 7. The male connector member 17A is associated with the winding bus terminal 13. It is clear that this configuration can be reversed, i.e. that the female connector member 17B is associated with the winding bus terminal 13 and the male connector member 17A with the inverter terminal 7.

The inverter bus 9 extends from the inverter terminal through a seal, here a gland, 19 in the inverter housing 5 to a remainder of the inverter circuit. To prevent oil and other debris from infiltrating the interior of the inverter 3, gland seals 21 are provided around the inverter bus 9. Retention means 29 are provided to retain the inverter bus from being pulled out of the inverter housing 5.

The inverter 3 is provided with a cooling body 31 for cooling the inverter. Accordingly, the inverter bus 9 also extends through a hole 35 in the cooling body 31. The cooling body 31 is provided adjacent an outer wall 33 of the inverter housing to transmit heat to towards the exterior of the inverter 3. More specifically, the cooling body 31 is provided between the outer wall 33 and an inner wall 35 of the inverter housing 5.

In FIG. 1, the drive unit 1 comprises additional sealing means 23 which provide a fluid sealing between a housing of the electric motor 25 and the inverter housing 5. The sealing means 23 comprise a resilient member 27.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

In the example an electric motor is described. It will be appreciated that additionally the vehicle may comprise an internal combustion engine.

The vehicle can comprise a transmission. It is possible that a housing of the transmission also houses the electric motor Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged and understood to fall within the framework of the invention as outlined by the claims. The specifications, figure and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A drive unit for an electrical vehicle comprising:
    an electric motor including a winding, wherein one end of the winding comprises a winding bus terminal;
    an inverter having an inverter housing, and an inverter circuit provided within the inverter housing, the inverter circuit comprising an inverter terminal extending outwardly of the inverter housing and an inverter bus extending between the inverter terminal and a remainder of the inverter circuit internally of the inverter housing through an opening of an inverter housing wall;
    a seal, which seal is arranged for providing a fluid seal between said inverter bus and said inverter housing wall; and
    a connector directly connecting the winding bus terminal with the inverter terminal, wherein the connector has a male connector member and a female connector member, wherein the winding bus terminal is associated with a first one of the male and female connector members and the inverter terminal is associated with a second one of the male and female connector members, the male connector member and the female connector member being arranged to mate, wherein in a connected state in which the male and female connector members mate, the winding bus terminal and the inverter terminal are electrically connected such as to establish an electrical connection between the winding of the electric motor and the inverter circuit, and
    wherein the connector is a snap-fit connector.

2. The drive unit according to claim 1, wherein the inverter terminal is associated with the female connector member.

3. The drive unit according to claim 1, wherein winding bus terminal is associated with the male connector member.

4. The drive unit according to claim 1, wherein at least one of the male and female connector members is arranged to elastically deform upon mating.

5. The drive unit according to claim 1, wherein the connector comprises locking means arranged for locking, in the connected state, the male and female connector members to each other.

6. The drive unit according to claim 1, comprising sealing means arranged for providing a fluid tight sealing between a housing of the electric motor and the inverter housing.

7. The drive unit according to claim 1, wherein the inverter circuit comprises six inverter terminals, each inverter terminal being associated with a respective phase of a six-phase electric power circuit.

8. The drive unit according to claim 7, wherein the electric motor comprises six winding bus terminals, each winding bus terminal arranged for connection with an associated inverter terminal.

9. The drive unit according to claim 1, wherein said seal is a gland seal.

* * * * *